United States Patent
Enami et al.

(10) Patent No.: US 12,553,468 B2
(45) Date of Patent: Feb. 17, 2026

(54) POSSIBILITY EVALUATION METHOD OF WHITE STRUCTURE FLAKING AND MEASUREMENT DEVICE USED FOR EVALUATION METHOD

(71) Applicant: NSK Ltd., Tokyo (JP)

(72) Inventors: Kakeru Enami, Fujisawa (JP); Hiroki Yamada, Fujisawa (JP); Hideyuki Uyama, Fujisawa (JP)

(73) Assignee: NSK Ltd., Tokyo (JP)

(*) Notice: Subject to any disclaimer, the term of this patent is extended or adjusted under 35 U.S.C. 154(b) by 293 days.

(21) Appl. No.: 18/271,552

(22) PCT Filed: May 31, 2022

(86) PCT No.: PCT/JP2022/022165
§ 371 (c)(1),
(2) Date: Jul. 10, 2023

(87) PCT Pub. No.: WO2022/270248
PCT Pub. Date: Dec. 29, 2022

(65) Prior Publication Data
US 2024/0052882 A1    Feb. 15, 2024

(30) Foreign Application Priority Data
Jun. 24, 2021    (JP) .................... 2021-104685

(51) Int. Cl.
*F16C 19/52* (2006.01)
*G01F 22/02* (2006.01)
(Continued)

(52) U.S. Cl.
CPC .............. *F16C 19/52* (2013.01); *G01F 22/02* (2013.01); *G01M 13/04* (2013.01);
(Continued)

(58) Field of Classification Search
CPC ..... G01F 22/02; F16C 19/52; G01N 33/2025; G01N 17/002; G01N 17/006; G01M 13/04
See application file for complete search history.

(56) References Cited

U.S. PATENT DOCUMENTS

2014/0007657 A1    1/2014    Matsubara et al.
2021/0318227 A1    10/2021   Yamada et al.

FOREIGN PATENT DOCUMENTS

JP    9-281079 A      10/1997
JP    2003-75384 A    3/2003
(Continued)

OTHER PUBLICATIONS

International Search Report (PCT/ISA/210) issued in PCT Application No. PCT/JP2022/022165 dated Aug. 2, 2022 with English translation (4 pages).
(Continued)

*Primary Examiner* — Paul M. West
(74) *Attorney, Agent, or Firm* — Crowell & Moring LLP (57) ABSTRACT

An object is to provide an evaluation method for detecting the amount of hydrogen supposed to influence white structure flaking in a simple manner in a short period of time and evaluating possibility of white structure flaking from the detected hydrogen amount. The provided is a possibility evaluation method of white structure flaking that, by measuring an amount of hydrogen gas generated under a condition simulating a use condition of a rolling device used in industrial equipment and existing in an atmosphere, evaluates possibility of white structure flaking in the rolling device.

8 Claims, 5 Drawing Sheets

(51) Int. Cl.
*G01M 13/04* (2019.01)
*G01N 17/00* (2006.01)
*G01N 33/2025* (2019.01)

(52) U.S. Cl.
CPC ......... *G01N 17/002* (2013.01); *G01N 17/006* (2013.01); *G01N 33/2025* (2019.01)

(56) References Cited

FOREIGN PATENT DOCUMENTS

| JP | 2012-180921 A | 9/2012 | |
|---|---|---|---|
| JP | 2013-234883 A | 11/2013 | |
| JP | 2019-35756 A | 3/2019 | |
| JP | 6683301 B1 | 4/2020 | |
| JP | 2021-63166 A | 4/2021 | |
| WO | WO-2020110593 A1 * | 6/2020 | ........... G01N 17/006 |

OTHER PUBLICATIONS

Japanese-language Written Opinion (PCT/ISA/237) issued in PCT Application No. PCT/JP2022/022165 dated Aug. 2, 2022 (4 pages).
International Preliminary Report on Patentability (PCT/IB/338 & PCT/IB/373) issued in PCT Application No. PCT/JP2022/022165 dated Jan. 4, 2024, including English translation (Japanese-language Written Opinion (PCT/ISA/237), filed on Jul. 10, 2023) (6 pages).
Extended European Search Report issued in European Application No. 22828166.3 dated Sep. 19, 2024 (8 pages).
Evan, M. et al., "Effect of Hydrogen on Butterfly and White Etching Crack (WEC) formation under Rolling Contact Fatigue (RCF)", Wear, Aug. 3, 2013, pp. 226-241, vol. 306, No. 1 XP028756684 (16 pages).

* cited by examiner

POSSIBILITY EVALUATION METHOD OF WHITE STRUCTURE FLAKING AND MEASUREMENT DEVICE USED FOR EVALUATION METHOD

TECHNICAL FIELD

The present invention relates to a possibility evaluation method of white structure flaking in a rolling device and a measurement device used for the evaluation method.

BACKGROUND ART

White structure flaking is one of forms of flaking occurring in a bearing caused by hydrogen having penetrated into bearing steel and is perceived as a problem since flaking occurs earlier than a calculated life. It is considered that the origin of hydrogen is lubricant used to lubricate a bearing. It is thought that lubricant decomposes while the bearing is in use and hydrogen is thereby generated. It is considered that when a use condition and a hydrogen generation amount from lubricant are quantitatively evaluated, it becomes possible to predict possibility of white structure flaking in the use condition. However, how much hydrogen is generated from lubricant in what use condition has not been clarified. Since hydrogen is likely to diffuses, it is difficult to measure a hydrogen generation amount in an actual machine with high accuracy. Therefore, evaluation of the hydrogen generation amount using an element tester has been performed.

A technology to predict possibility of occurrence of white structure flaking is disclosed in PTL 1. PTL 1 discloses an evaluation device that is capable of evaluating diffusible hydrogen penetrating into material of which a rolling device, such as a bearing, is formed. The evaluation device uses a tester that presses and slides a rotating disk-shaped sliding member against a disk-shaped test piece, detects diffusible hydrogen from the test piece discharged in a diffusible hydrogen detection chamber that is disposed under the test piece and evacuated, using a hydrogen detection means, such as a quadrupole mass spectrometer, and targets evaluation under a pure sliding condition.

In addition, PTL 2 discloses a technology to predict possibility that white structure flaking occurs by operating a rolling device including steel rolling members that come into rolling contact with each other to test a rolling life under some test condition, measuring a non-diffusible hydrogen amount in the steel rolling members after operation, calculating an increase rate of the non-diffusible hydrogen amount from a test duration of the rolling life test, and comparing the calculated increase rate with a critical non-diffusible hydrogen amount increase rate at which white structure is formed.

CITATION LIST

Patent Literature

PTL 1: JP 2013-234883 A
PTL 2: JP 6683301 B

SUMMARY OF INVENTION

Technical Problem

The technology described in PTL 1 causes hydrogen that has penetrated into a test piece and become diffusible hydrogen among hydrogen generated by sliding to be discharged into the diffusible hydrogen detection chamber that is evacuated and detects the diffusible hydrogen in the diffusible hydrogen detection chamber. Therefore, since a device for evacuating the diffusible hydrogen detection chamber is required to cause diffusible hydrogen that has penetrated into a test piece to be discharged into the diffusible hydrogen detection chamber, there is a problem in that the device becomes larger in scale. In addition, evaluation of hydrogen detection is performed under a pure sliding condition. There is a possibility that evaluation in a vacuum environment and under a pure sliding condition does not completely simulate a use condition of a rolling device that is used in industrial equipment. In addition, although relative evaluation of a generated diffusible hydrogen amount is possible, possibility of white structure flaking caused by hydrogen cannot be predicted.

In the technology described in PTL 2, there is a problem in that since the non-diffusible hydrogen amount after test is measured, it takes a long time for hydrogen that has penetrated into a steel rolling member to be trapped as non-diffusible hydrogen.

The present invention has been made in consideration of the above-described problem, and an object of the present invention is to provide an evaluation method that does not require a device for evacuation and detects the amount of hydrogen supposed to influence white structure flaking in a simple manner in a short period of time and evaluates possibility of white structure flaking from the detected hydrogen amount and a measurement device used for the evaluation method.

Solution to Problem

According to an aspect of the embodiment of the present invention, there is provided a possibility evaluation method of white structure flaking, wherein the possibility evaluation method, by measuring an amount of hydrogen gas generated under a condition simulating a use condition of a rolling device used in industrial equipment and existing in an atmosphere, evaluates possibility of white structure flaking in the rolling device.

According to another aspect of the embodiment of the present invention, there is provided a measurement device including: sliding members, at least one of the sliding members being able to rotate about a central axis at variable speed, the sliding members slidably coming into contact with each other; a hermetically sealed container having the sliding members housed inside; lubricant contained in the hermetically sealed container and supplied to a contact surface at which the sliding members come into contact with each other; and a hydrogen measurement means for measuring an amount of hydrogen gas in the hermetically sealed container, wherein the measurement device measures an amount of hydrogen gas in the hermetically sealed container.

Advantageous Effects of Invention

The present invention enables a possibility evaluation method that does not require a device for evacuation and detects the amount of hydrogen gas supposed to influence white structure flaking under a condition simulating a use condition of a rolling device used in industrial equipment in a simple manner in a short period of time and evaluates possibility of white structure flaking of the rolling device from the measured amount of hydrogen gas and a measurement device used for the evaluation method to be provided.

DESCRIPTION OF EMBODIMENTS

An embodiment of the present invention will be described in detail with reference to the drawings. Note that the following embodiment indicates devices and methods to embody the technical idea of the present invention by way of example, and the technical idea of the present invention does not limit the configurations, arrangements, and the like of the constituent components to those described below. The technical idea of the present invention can be subjected to a variety of alterations within the technical scope prescribed by the claims described in CLAIMS.

Embodiment (Measurement Device)

Figure 1A:
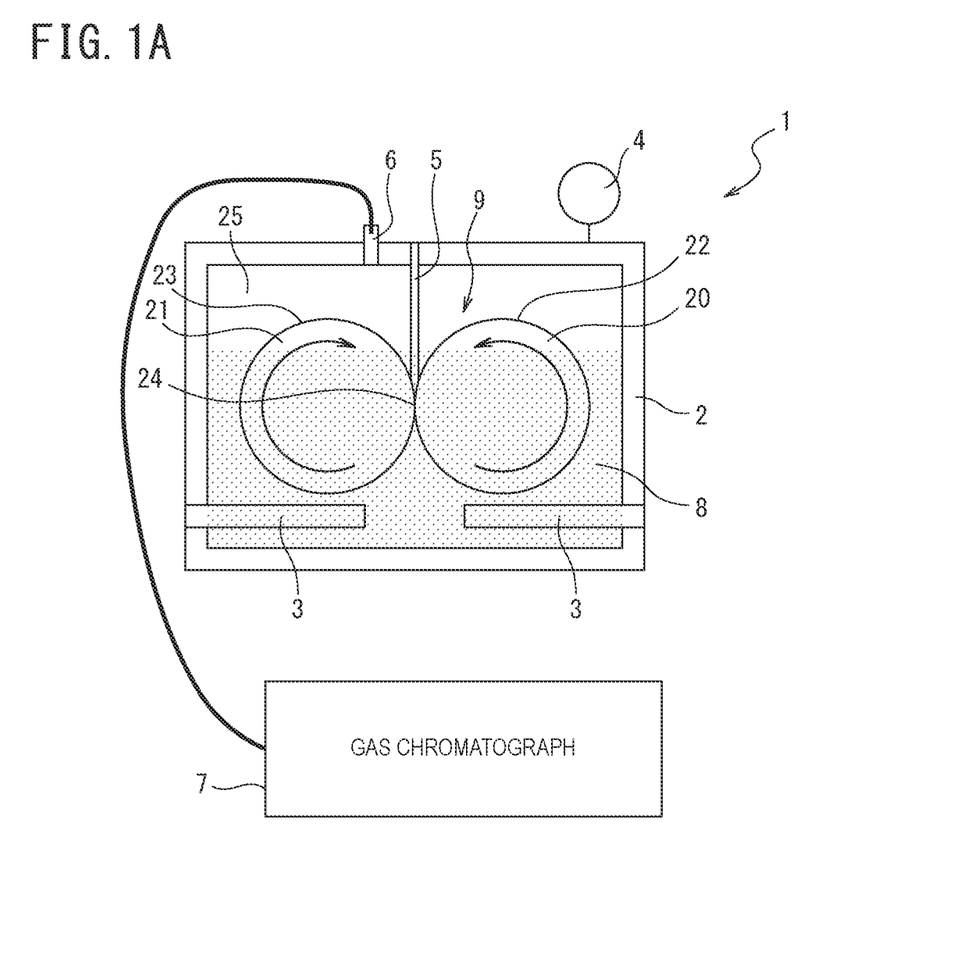
FIG. 1A is a configuration diagram illustrative of an overview of a measurement device of an embodiment as viewed from the front.
Figure 1B:
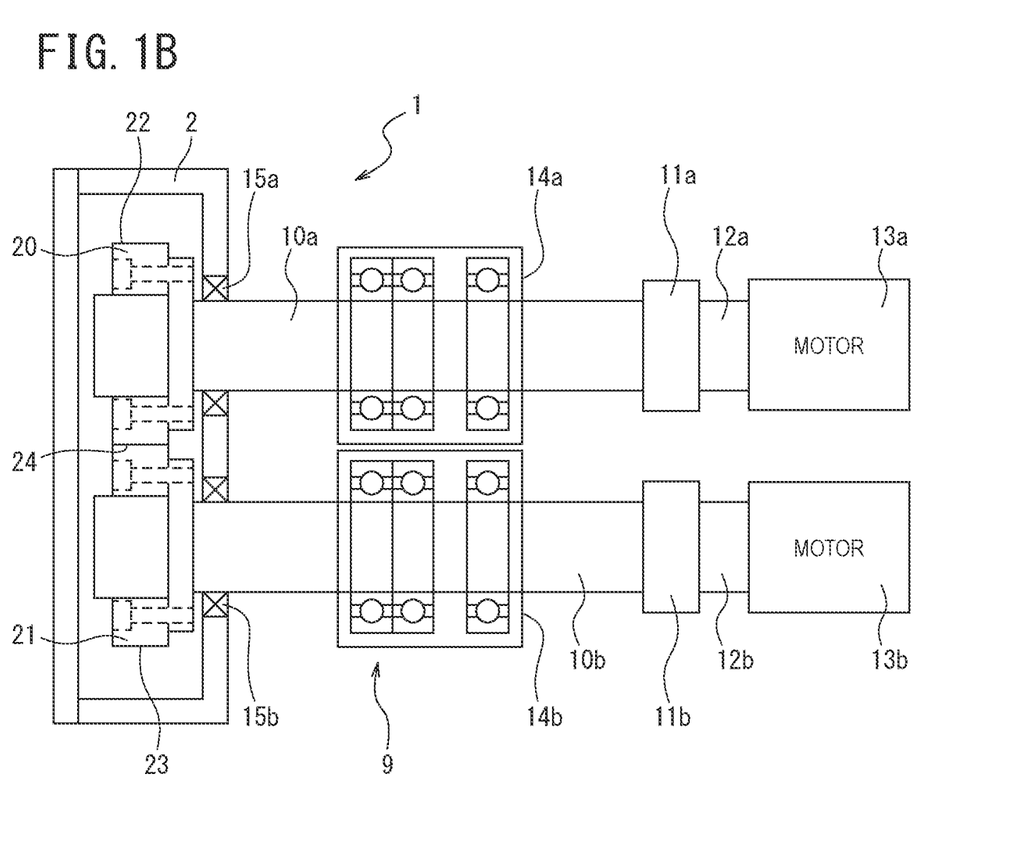
FIG. 1B is another configuration diagram illustrative of the overview of the measurement device of the embodiment as viewed from above the upper face.

FIG. 1A is a configuration diagram illustrative of an overview of a measurement device representing an embodiment of the present invention as viewed from the front, and the measurement device of the present invention is a measurement device used for an evaluation method for performing evaluation of possibility of white structure flaking in a rolling device, such as a rolling bearing and a sliding bearing. In addition, FIG. 1B is a configuration diagram illustrative of the overview of the measurement device representing the embodiment of the present invention as viewed from above the upper face.

A measurement device 1 representing the embodiment of the present invention includes a double cylinder test device 9 and a hermetically sealed container 2. The double cylinder test device 9 includes a cylindrical steel sliding member 20 and a cylindrical steel sliding member 21. The cylindrical steel sliding members 20 and 21 are equivalent to members used in a rolling device, such as a rolling bearing and a sliding bearing. One sliding member 20 is fixed to one end of a shaft 10a that is rotatable about a central axis, and the other sliding member 21 is fixed to one end of a shaft 10b that is rotatable about a central axis. The sliding member 20 and the sliding member 21 are housed inside the hermetically sealed container 2.

The shaft 10a is supported by the hermetically sealed container 2 via an oil seal 15a, and the other end of the shaft 10a is connected to a motor shaft 12a of a motor 13a via a coupling 11a. In addition, a middle portion between a site of the shaft 10a supported by the oil seal 15a and a site of the shaft 10a connected to the motor shaft 12a is supported by inner rings of middle support bearings 14a. Note that outer rings of the middle support bearings 14a are supported by a not-illustrated block. Likewise, the shaft 10b is supported by the hermetically sealed container 2 via an oil seal 15b, and the other end of the shaft 10b is connected to a motor shaft 12b of a motor 13b via a coupling 11b. In addition, a middle portion between a site of the shaft 10b supported by the oil seal 15b and a site of the shaft 10b connected to the motor shaft 12b is supported by inner rings of middle support bearings 14b. Note that outer rings of the middle support bearings 14b are supported by a not-illustrated block.

The shaft 10a is fixed on a not-illustrated linear guide and can move in a horizontal direction through translational movement. Applying a load to the shaft 10a moving in the horizontal direction enables interaxial distance between the shaft 10a and the shaft 10b to be changed and also enables a circumferential surface 22 of the sliding member 20 fixed to the shaft 10a and a circumferential surface 23 of the sliding member 21 fixed to the shaft 10b to come into contact with each other. Although, in the present embodiment, the shaft 10a fixed on the not-illustrated linear guide can move in the horizontal direction through translational movement, the shaft 10b, instead of the shaft 10a, may be configured to be fixed on a not-illustrated linear guide and be able to move in the horizontal direction through translational movement, that is, at least either the shaft 10a or the shaft 10b is only required to be able to move in the horizontal direction through translational movement.

By applying a load to the shaft 10a that is movable in the horizontal direction and fixing the other shaft, the measurement device 1 of the present embodiment is capable of applying contact pressure to a contact surface 24 at which the circumferential surface 22 of the sliding member 20 and the circumferential surface 23 of the sliding member 21 come into contact with each other. The oil seals 15a and 15b are oil seals that, even when the shafts 10a and 10b move in the horizontal direction, can deform in such a way as to absorb the movement. Therefore, even when at least one of the shaft 10a and the shaft 10b moves in the horizontal direction through translational movement, it is possible to maintain sealability of the hermetically sealed container 2.

The shaft 10a is axially rotatable by the connected motor 13a, and the shaft 10b is also axially rotatable by the connected motor 13b. Since the motors 13a and 13b are motors the rotational speed of which is variable, changing the rotational speed of the motor 13a enables circumferential speed of the circumferential surface 22 of the sliding member 20 to be changed and changing the rotational speed of the motor 13b enables circumferential speed of the circumferential surface 23 of the sliding member 21 to be changed. Therefore, when the circumferential speed of the circumferential surface 22 of the sliding member 20 and the circumferential speed of the circumferential surface 23 of the sliding member 21 are caused to coincide with each other, the sliding member 20 and the sliding member 21 can come into contact with each other in a pure rolling condition where no sliding occurs, when the circumferential speed of the circumferential surface 22 of the sliding member 20 and the circumferential speed of the circumferential surface 23 of the sliding member 21 are different speeds, the sliding member 20 and the sliding member 21 can come into contact with each other in a rolling-sliding contact condition, and when one of the sliding member 20 and the sliding member 21 is stopped rotating and the other is rotated, the sliding member 20 and the sliding member 21 can come into contact with each other in a pure sliding contact condition.

As lubricant for lubricating the contact surface 24 between the sliding member 20 and the sliding member 21, lubricating oil 8 is contained inside the hermetically sealed container 2, and the lubricating oil 8 of only an amount that is sufficiently high to cause the contact surface 24 at which the circumferential surface 22 of the sliding member 20 and the circumferential surface 23 of the sliding member 21 come into contact with each other to be entirely submerged in the lubricating oil 8 and allows a space (head space) 25 to be secured on top of the lubricating oil 8 is contained. Therefore, inside the hermetically sealed container 2, the lower side including the contact surface 24 is filled with the lubricating oil 8 and, on the upper side, the head space 25 in which no lubricating oil exists is secured and air is contained in the head space 25. Although, in the present embodiment, air is contained in the hermetically sealed container 2, gas inside the hermetically sealed container 2 can be arbitrarily controlled.

Inside the hermetically sealed container 2, heaters 3 for heating the lubricating oil 8 are arranged on the lower side, and, inside the head space 25, a gas port 6 for sucking gas including hydrogen gas that has accumulated in the head space 25 and a pressure gauge 4 for detecting pressure in the head space 25 are arranged. In addition, a temperature detection means 5 for detecting temperature of the lubricating oil 8 around the contact surface 24 is arranged. The gas port 6 is connected to a gas chromatograph 7 that is a hydrogen measurement means of the present invention via a tube. When evaluation is to be performed with the inside of the hermetically sealed container 2 evacuated, it is only required to use a quadrupole-type mass spectrometer as the hydrogen measurement means, and when evaluation is to be performed using a quadrupole-type mass spectrometer as the hydrogen measurement means, it is only required to evacuate the inside of the hermetically sealed container 2. In addition, as the temperature detection means 5, a thermocouple is used.

The measurement device 1 of the present embodiment is capable of performing a test in which electric current is flowed to the contact surface 24 between the sliding member 20 and the sliding member 21 by causing the middle support bearings 14a and 14b and the couplings 11a and 11b for the shafts 10a and 10b to have insulation properties and connecting an external power source to the shafts 10a and 10b. In this case, it is possible to evaluate hydrogen gas that is generated from the lubricant under the influence of electricity. Note, however, that the middle support bearings 14a and 14b and the couplings 11a and 11b do not necessarily have to have insulation properties.

(Evaluation Method)

An evaluation method for evaluating the possibility of white structure flaking in the present embodiment will be described below.

First, using the measurement device 1, the amount of hydrogen gas that is generated from the lubricating oil 8 is repeatedly measured under the same condition. The test is performed by controlling contact pressure and sliding speed at the contact surface 24 at which the circumferential surface 22 of the sliding member 20 and the circumferential surface 23 of the sliding member 21 come into contact with each other, temperature of the lubricating oil 8, and entrainment speed of the lubricating oil 8. After a lapse of a predetermined test duration, a hydrogen gas generation amount inside the hermetically sealed container 2 is measured by the gas chromatograph 7. As used herein, the sliding speed is a difference between the circumferential speed of the circumferential surface of the sliding member 20 and the circumferential speed of the circumferential surface of the sliding member 21. The entrainment speed is an average of the circumferential speed of the circumferential surface 22 of the sliding member 20 and the circumferential speed of the circumferential surface 23 of the sliding member 21. For example, when the circumferential speed of the circumferential surface 22 of the sliding member 20 is 1.5 m/s and the circumferential speed of the circumferential surface 23 of the sliding member 21 is 0.5 m/s, the sliding speed is (1.5−0.5)=1 m/s and the entrainment speed is (1.5+0.5)/2=1 m/s. The evaluation is performed under various test conditions, and relationships between the test conditions and the hydrogen gas generation amounts are quantitatively evaluated. Next, a double cylinder durability test is performed, and, by comparing occurrence or non-occurrence of white structure formation under a condition of the durability test with the hydrogen gas generation amount under the same condition, a hydrogen gas generation amount that serves as a threshold at which a white structure is formed is determined. Next, the hydrogen gas generation amount after a lapse of a predetermined test duration is measured using the measurement device 1 under a condition simulating a use condition of a rolling device for which the possibility of white structure flaking is to be evaluated. Examples of the use condition include the type of lubricant, temperature of the lubricant, the entrainment speed of the lubricant, the sliding speed, a film thickness ratio, surface roughness of a contact surface, contact pressure, and the type of atmospheric gas. Comparing the hydrogen gas generation amount under the condition simulating the use condition of the rolling device for which the possibility of white structure flaking is to be evaluated with the hydrogen gas generation amount threshold at which a white structure is formed enables the possibility of white structure flaking to be quantitatively evaluated.

Examples in which the present measurement device 1 is used will be described below.

Example 1: Repeat Test

A repeat test under the same condition was performed. Test conditions are as follows. As the lubricating oil 8, VG32 oil was used. The temperature of the lubricating oil 8 was set to 90° C. The contact pressure at the contact surface 24 was set to 2.3 GPa. The entrainment speed and sliding speed of the lubricating oil 8 were set to 1.6 m/s and 0.31 m/s, respectively. The test duration was set to 20 hours. Evaluation was repeated 10 times under the above-described conditions. After a hydrogen gas generation amount inside the hermetically sealed container 2 was measured using the gas chromatograph 7, the inside of the hermetically sealed container 2 was purged by air for the purpose of removing hydrogen gas in the hermetically sealed container 2. After confirming that no hydrogen gas generated in the hermetically sealed container 2 remains, the next test was performed.

Figure 2:
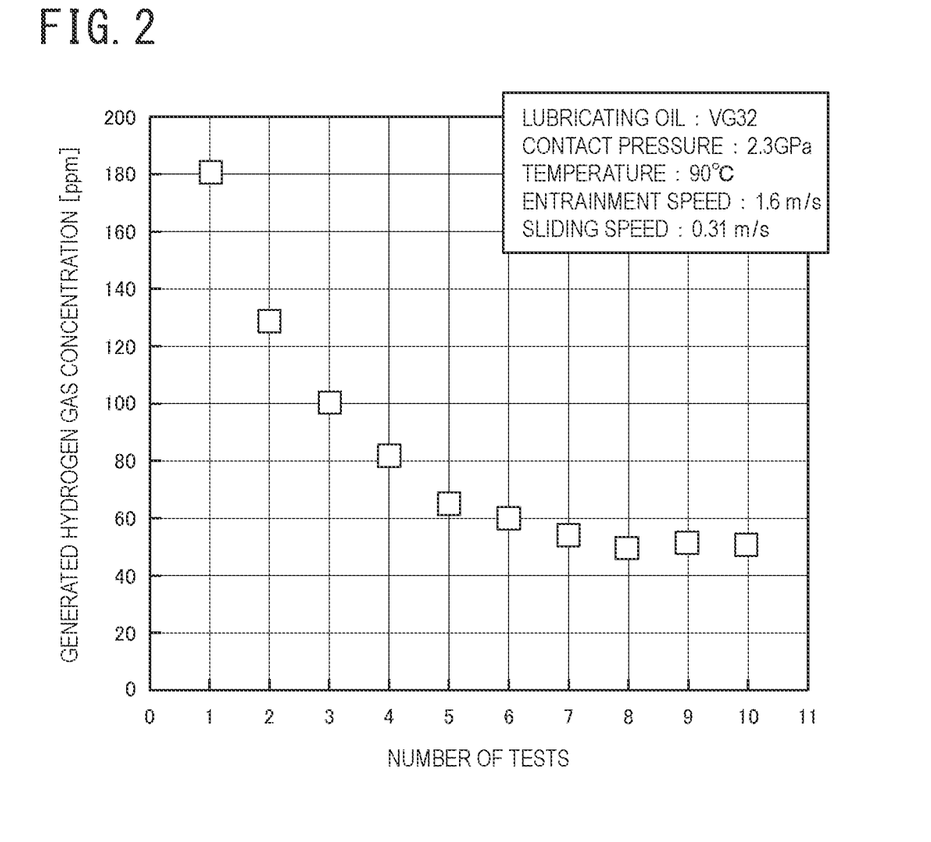
FIG. 2 is a graph illustrative of a relationship between generated hydrogen gas concentration and the number of repetitions of a test.

A result of Example 1 is illustrated in FIG. 2. The result indicates that hydrogen gas can be detected by performing the test using the present measurement device 1 and hydrogen gas generation from the lubricating oil 8 can be evaluated.

The largest hydrogen gas generation amount was measured in the first repetition of the test, the hydrogen gas generation amount decreased as the number of repetitions of the test increased, and the hydrogen gas generation amount finally converged to a stable value. It is more preferable to use, as a test result under the present test condition, a value to which the hydrogen gas amount has stabilized after the test was repeatedly performed.

The reasons why the hydrogen gas generation amount was large in the first repetition of the test include influence of dissolved water contained in the lubricating oil 8, running-in between the sliding members 20 and 21, and the like. A water molecule is composed of hydrogen and oxygen, and water also becomes a source of hydrogen. The amount of dissolved water in the lubricating oil 8 is influenced by an environmental factor, such as humidity and atmospheric temperature. Therefore, in order to increase accuracy when hydrogen gas generated from the lubricating oil 8 is evaluated, it is preferable to exclude influence of dissolved water that may become a disturbance.

For that reason, performing a step of removing water contained in the lubricant in advance and subsequently performing a test and evaluation enables the accuracy when the amount of hydrogen gas generated from the lubricating oil 8 is evaluated to be increased.

Example 2: Evaluation of Relationship Between Sliding Speed and Hydrogen Gas Generation Amount A correlation between the sliding speed that is a difference between the circumferential speed of the circumferential surface 22 of the sliding member 20 and the circumferential speed of the circumferential surface 23 of the sliding member 21 and the amount of hydrogen gas generated from the lubricating oil 8 was examined using the measurement device 1. Test conditions are as follows. As the lubricating oil 8, VG32 oil was used. The temperature of the lubricating oil 8 was set to 70° C. and 90° C. The contact pressure at the contact surface 24 was set to 2.3 GPa. The entrainment speed of the lubricating oil 8 was set to 1.6 m/s, and the sliding speed of the lubricating oil 8 was changed between 0 m/s and 1.3 m/s. After a lapse of 20 hours from test start, the amount of hydrogen gas inside the hermetically sealed container 2 was measured by the gas chromatograph 7. Further, the circumferential speed of the circumferential surface 22 of the sliding member 20 and the circumferential speed of the circumferential surface 23 of the sliding member 21 were caused to coincide with each other while causing the circumferential surface 22 of the sliding member 20 and the circumferential surface 23 of the sliding member 21 not to come into contact with each other and the lubricating oil 8 was heated to 70° C. and 90° C., and a generated hydrogen gas amount was measured. As a measurement result under each test condition, a value when the hydrogen gas amount has stabilized after the test was repeatedly performed was used.

Figure 3:
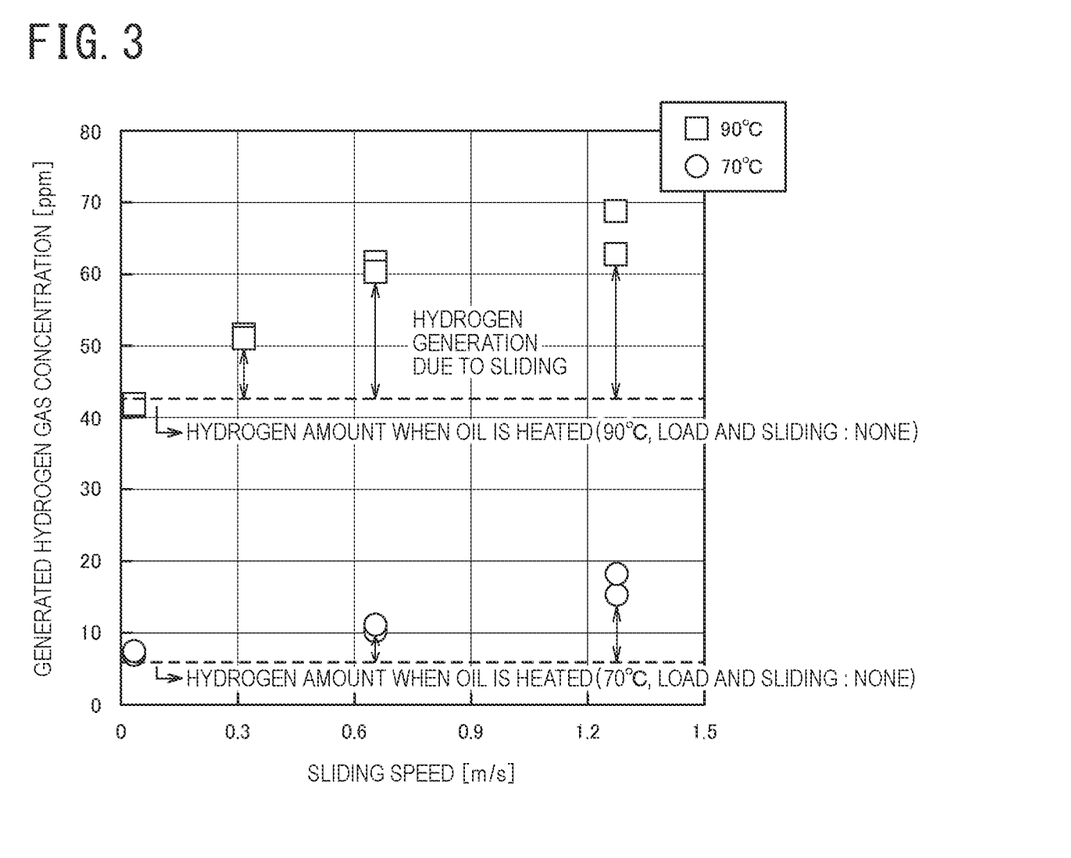
FIG. 3 is a graph illustrative of a relationship between the generated hydrogen gas concentration and sliding speed.

A test result of Example 2 is illustrated in Table 1 and FIG. 3. The test result of Example 2 is a measurement result of the hydrogen gas generation amount when influence of water on the lubricating oil 8 is excluded in advance and the hydrogen gas amount has stabilized. A test under each condition was performed twice after a hydrogen gas amount had stabilized. Square marks indicate results in the case where the temperature of the lubricating oil 8 was set to 90° C., and circle marks indicate results in the case where the temperature of the lubricating oil 8 was set to 70° C. As the sliding speed increased, a generation amount of hydrogen gas increased. In addition, the generation amounts of hydrogen gas in the case where the temperature of the lubricating oil 8 was high were larger than in the case where the temperature of the lubricating oil 8 was low. Further, hydrogen gas amounts that were generated when the lubricating oil 8 was heated with the circumferential surface 22 of the sliding member 20 and the circumferential surface 23 of the sliding member 21 caused not to come into contact with each other are illustrated by dashed lines in FIG. 3. It is considered that an increased amount from an amount indicated by each dashed line is a hydrogen gas amount that is generated by rolling-sliding contact. In the present test result, a result that the hydrogen gas generation amount was largest and the possibility of white structure flaking was highest under the condition that the temperature of the lubricating oil 8 was 90° C. and the sliding speed was 1.3 m/s was obtained.

It has been considered that, with regard to generation of hydrogen gas from lubricant, catalytic reaction of a nascent surface of a metal surface causes the lubricant to decompose and hydrogen gas to be generated. Increasing sliding speed or increasing the temperature of the lubricating oil and thereby thinning oil film thickness causes frequency of direct contact at the contact surface to be increased. It is considered that the increased direct contact caused exposure of a nascent surface caused by the direct contact to be increased, decomposition of the lubricant due to catalytic reaction of the nascent metal surface to be accelerated, and the hydrogen gas generation amount to be increased. It is also considered that improved reactivity of the lubricating oil due to increased temperature of the lubricating oil 8 caused an increase in the hydrogen gas generation amount.

TABLE 1

Hydrogen Generation Amount from Lubricating Oil under Each Test Condition

| Lubricating Oil | Contact Pressure [GPa] | Temperature [° C.] | Entrainment Speed [m/S] | Sliding Speed [m/S] | Test Duration [h] | Hydrogen Generation Amount [ppm] | |
|---|---|---|---|---|---|---|---|
| VG32 | 2.3 | 70 | 1.6 | 0.03 | 20 | 6.5 | 7.2 |
| | | | | 0.66 | 20 | 10 | 11 |
| | | | | 1.3 | 20 | 15 | 18 |
| | | | — | — | 20 | 5.6(*1) | |
| | 2.3 | 90 | 1.6 | 0.03 | 20 | 41 | 42 |
| | | | | 0.31 | 20 | 51 | 51 |
| | | | | 0.66 | 20 | 61 | 60 |
| | | | | 1.3 | 20 | 69 | 63 |
| | | | — | — | 20 | 42 | |

(*1)Interpolated Value

Example 3: Evaluation of Relationship Between Hydrogen Gas Generation Amount and White Structure In Example 3, a relationship between the relationship between the sliding speed and the amount of hydrogen gas generated from the lubricating oil 8 that was obtained in Example 2 and occurrence or non-occurrence of white structure formation in the sliding member 20 and the sliding member 21 in a durability test was evaluated. The durability test was performed under the same condition as that in Example 2, and, by observing cross sections of the sliding member 20 and the sliding member 21 after the durability test, occurrence or non-occurrence of white structure formation was confirmed. Durations of the durability test were set to 755 hours when the sliding speed was 0.03 m/s and 750 hours when the sliding speed was 0.66 m/s and 1.3 m/s.

Figure 4:
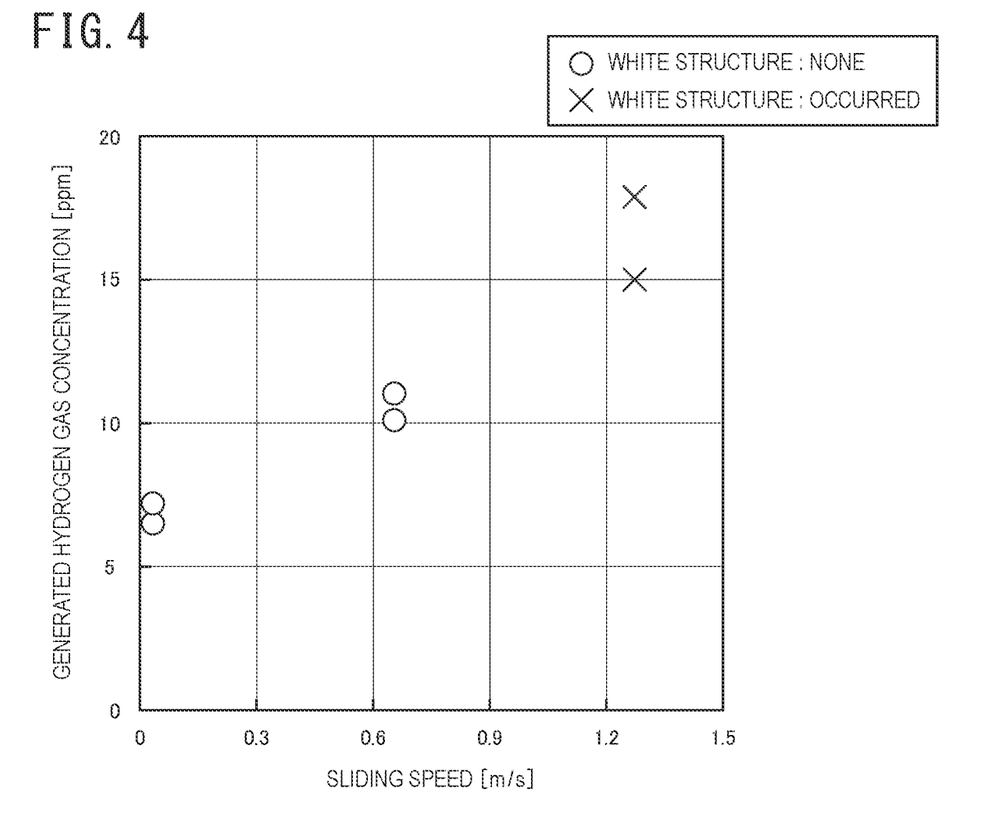
FIG. 4 is a graph illustrative of a relationship between the generated hydrogen gas concentration and the sliding speed and occurrence or non-occurrence of white structure formation.

A test result of Example 3 is illustrated in Table 2 and FIG. 4. In FIG. 4, circle marks indicate cases where there occurred no formation of a white structure, and cross marks indicate cases where there occurred formation of a white structure. When the hydrogen gas generation amount was large, a white structure was formed. Based on this relationship, measuring the hydrogen gas amount enables the possibility of white structure flaking to be predicted. When a similar test is performed under various conditions, a threshold for the hydrogen gas generation amount at which a white structure is formed can be determined. Measuring the hydrogen gas amount using the measurement device 1 under a test condition simulating a use condition of a rolling device for which the possibility of white structure flaking is to be evaluated and comparing the measured hydrogen gas amount with the hydrogen gas generation amount threshold at which a white structure is formed enable the possibility of white structure flaking to be quantitatively determined.

structure flaking has been a problem to be solved, is actually used, as a result of which a measurement device that has a high general versatility can be provided.

In addition, in the measurement device 1 of the present embodiment, both the sliding member 20 and the sliding member 21 are capable of rotating at variable speed about the central axes, circumferential speed due to rotation of the sliding member 20 and circumferential speed due to rotation of the sliding member 21 can be arbitrarily controlled, and evaluation can be performed by reproducing not only the pure sliding condition but also the rolling-sliding contact condition and the pure rolling condition. In addition, the type and temperature of the lubricating oil 8, the contact pressure at the contact surface 24, and the atmosphere in the hermetically sealed container 2 can also be arbitrarily controlled. Therefore, evaluation can be performed under a test condition that simulates a condition under which a bearing for windmill or a bearing for alternator for which white structure flaking has been a problem to be solved is used, and a measurement device that has a high general versatility can be provided.

Note that although, in the measurement device 1 in the present embodiment, the lubricating oil 8 was used as a lubricant, grease or solid lubricant may be used instead of lubricating oil. When grease or solid lubricant is used, in

TABLE 2

Relationship between Hydrogen Generation Amount and Occurrence or Not of White Structure

| Lubricating Oil | Contact Pressure [GPa] | Temperature [° C.] | Entrainment Speed [m/S] | Sliding Speed [m/S] | Test Duration [h] | Hydrogen Generation Amount [ppm] | | Occurrence or Not of White Structure Formation in Durability Test |
|---|---|---|---|---|---|---|---|---|
| VG32 | 2.3 | 70 | 1.6 | 0.03 | 20 | 6.5 | 7.2 | None |
|  |  |  |  | 0.66 | 20 | 10 | 11 | None |
|  |  |  |  | 1.3 | 20 | 15 | 18 | Occurred |

In the present embodiment, for the measurement device 1, the double cylinder test device 9 in which the sliding member 20 and the sliding member 21 are cylindrical, that includes the shafts 10a and 10b that fix the sliding member 20 and the sliding member 21, respectively and are capable of rotating at variable speed about the central axes, and in which the interaxial distance between the shafts 10a and 10b is changeable and changing the interaxial distance causes the sliding member 20 and the sliding member 21 to slidably come into contact with each other is used. Since, therefore, the measurement device 1 is capable of performing evaluation by reproducing not only a pure sliding condition but also a rolling-sliding contact condition and a pure rolling condition that are the same as a condition under which a rolling device used in industrial equipment is placed, a measurement device that has a high general versatility can be provided.

In addition, in the measurement device 1 of the present embodiment, the sliding member 20 and the sliding member 21 are housed using the hermetically sealed container 2 and the inside of the head space 25 of the hermetically sealed container 2 is filled with air. Since, therefore, a test can be performed in an atmospheric air environment without a test atmosphere being limited to a vacuum, evaluation can be performed under the same condition as a condition in an environment in which a bearing, such as a bearing for windmill and a bearing for alternator for which white order to submerge the contact surface 24 at which the circumferential surface 22 of the sliding member 20 and the circumferential surface 23 of the sliding member 21 come into contact with each other in the grease or the solid lubricant, the grease or the solid lubricant is only required to be supplied to the contact surface 24, using, for example, a grease gun.

In addition, although, in the present embodiment, the double cylinder test device 9 was used for the measurement device 1, the double cylinder test device 9 does not have to be used. For example, an evaluation test may be performed under the pure sliding condition by using a sliding mechanism that includes a disk-shaped sliding member that is made of steel and rotates and a second sliding member that is pressed against an edge surface of the disk-shaped sliding member and housing the disk-shaped sliding member and the second sliding member in the hermetically sealed container 2. In this case, when a mechanism in which the second sliding member can rotate is used, an evaluation test under the rolling-sliding condition or the pure rolling condition can also be performed.

Although, in the present embodiment, the possibility of white structure flaking was evaluated using the measurement device 1, use of the measurement device 1 of the present embodiment enables not only the possibility of white structure flaking to be evaluated but also evaluation of a lubricating oil to be easily performed by, for example, measuring amounts of generation of hydrogen gas for different lubricating oils.

Although, in the present embodiment, the possibility of white structure flaking was evaluated using the measurement device 1, use of the measurement device 1 of the present embodiment enables not only the possibility of white structure flaking to be evaluated but also evaluation of material composition or coating with respect to hydrogen gas generation from a lubricating oil to be easily performed by, for example, changing composition of materials of the sliding member 20 and the sliding member 21 or performing coating treatment on the sliding member 20 and the sliding member 21.

Although, in the present embodiment, the double cylinder test device 9 was used for the measurement device 1, the double cylinder test device 9 does not have to be used. For example, a test device that can operate a bearing that is a product may be used.

While the present invention has been described herein referring to a limited number of embodiments, the scope of the present invention is not limited to the embodiments, and modifications and variations of the embodiments based on the above-described disclosure are apparent to a person skilled in the art.

REFERENCE SIGNS LIST

1 Measurement device
2 Hermetically sealed container
3 Heater
4 Pressure gauge
5 Temperature detection means
6 Gas port
7 Gas chromatograph (Hydrogen measurement means)
8 Lubricating oil
9 Double cylinder test device
10a Shaft
10b Shaft
11a Coupling
11b Coupling
12a Motor shaft
12b Motor shaft
13a Motor
13b Motor
14a Middle support bearing
14b Middle support bearing
15a Oil seal
15b Oil seal
20 Sliding member
21 Sliding member
22 Circumferential surface
23 Circumferential surface
24 Contact surface
25 Head space

The invention claimed is:

1. A measurement device, comprising:
   sliding members, at least one of the sliding members being able to rotate about a central axis at variable speed, the sliding members slidably coming into contact with each other;
   a hermetically sealed container having the sliding members housed inside;
   lubricant contained in the hermetically sealed container and supplied to a contact surface at which the sliding members come into contact with each other; and
   a hydrogen measurement means for measuring an amount of hydrogen gas in the hermetically sealed container,
   wherein the measurement device measures an amount of hydrogen gas in the hermetically sealed container,
   wherein
   the sliding members are cylindrical or barrel-shaped, the measurement device includes a double cylinder test device including two shafts each configured to fix the sliding members and capable of rotating about central axes, wherein interaxial distance between the two shafts is changeable and changing the interaxial distance causes the sliding members to slidably come into contact with each other, and
   the two shafts are attached to the hermetically sealed container via oil seals.

2. The measurement device according to claim 1, wherein, by differentiating rotational speed of one of the two shafts from rotational speed of the other of the two shafts, the sliding members come into rolling-sliding contact with each other.

3. The measurement device according to claim 2, wherein the oil seals deform in such a manner as to be able to absorb change in interaxial distance between the two shafts.

4. The measurement device according to claim 3, wherein the hermetically sealed container has air inside.

5. The measurement device according to claim 2, wherein the hermetically sealed container has air inside.

6. The measurement device according to claim 1, wherein the oil seals deform in such a manner as to be able to absorb change in interaxial distance between the two shafts.

7. The measurement device according to claim 6, wherein the hermetically sealed container has air inside.

8. The measurement device according to claim 1, wherein the hermetically sealed container has air inside.

* * * * *